United States Patent
Weinzierle et al.

(10) Patent No.: US 11,828,642 B2
(45) Date of Patent: Nov. 28, 2023

(54) IMPEDANCE POINT LEVEL SENSOR

(71) Applicant: VEGA GRIESHABER KG, Wolfach (DE)

(72) Inventors: Christian Weinzierle, Wolfach (DE); Juergen Haas, Oberwolfach (DE)

(73) Assignee: Vega Grieshaber KG, Wolfach (DE)

( * ) Notice: Subject to any disclaimer, the term of this patent is extended or adjusted under 35 U.S.C. 154(b) by 547 days.

(21) Appl. No.: 17/050,498

(22) PCT Filed: May 7, 2019

(86) PCT No.: PCT/EP2019/061627
§ 371 (c)(1),
(2) Date: Oct. 26, 2020

(87) PCT Pub. No.: WO2019/215118
PCT Pub. Date: Nov. 14, 2019

(65) Prior Publication Data
US 2021/0239506 A1     Aug. 5, 2021

(30) Foreign Application Priority Data
May 8, 2018 (DE) ..................... 10 2018 111 058.8

(51) Int. Cl.
    *G01F 23/263*      (2022.01)
(52) U.S. Cl.
    CPC .......... *G01F 23/265* (2013.01); *G01F 23/266* (2013.01)
(58) Field of Classification Search
    CPC .... G01F 23/265; G01F 23/266; G01F 23/268; G01F 23/26; G01F 23/263; G01F 23/242;
(Continued)

(56) References Cited

U.S. PATENT DOCUMENTS

| | | |
|---|---|---|
| 2,999,230 A | 9/1961 | Laakmann |
| 4,389,900 A | 6/1983 | Gutierrez |
| (Continued) | | |

FOREIGN PATENT DOCUMENTS

| | | |
|---|---|---|
| DE | 244205 B1 | 10/1974 |
| DE | 8527899 U1 | 2/1986 |
| (Continued) | | |

OTHER PUBLICATIONS

GPTO office action for related German application DE 10 2018 111 058.8, dated Apr. 17, 2019.
(Continued)

*Primary Examiner* — John Fitzgerald
*Assistant Examiner* — Truong D Phan
(74) *Attorney, Agent, or Firm* — William Gray Mitchell (57) ABSTRACT

The invention is an impedance threshold level sensor, comprising: a measuring probe which can be influenced by a medium surrounding the measuring probe in a measuring capacitance, the measuring probe comprising a measurement electrode and a reference electrode insulated from the measurement electrode, between which the measuring capacitance is formed, a measuring resonant circuit, in which the measuring probe is arranged as a capacitance-determining element, an electronic unit having a signal generator for exciting the measuring resonant circuit and a signal detector for determining a response signal of the measuring resonant circuit, a signal processing unit for generating a measurement signal, which is connected to the electronic unit, wherein the measurement electrode and the reference electrode are designed and arranged such that an increasing filling level of the medium reaches the reference electrode earlier than or together with the measurement electrode.

9 Claims, 4 Drawing Sheets

(58) Field of Classification Search
CPC ...... G01F 23/241; G01F 1/56; G01F 23/0007; G01F 23/806; G01F 3/224; G01F 15/02
USPC ..................................................... 73/866.5
See application file for complete search history.

(56) References Cited

U.S. PATENT DOCUMENTS

| | | | | |
|---|---|---|---|---|
| 5,602,333 | A | * | 2/1997 | Larrabee ............... G01F 23/268 73/304 C |
| 2008/0224922 | A1 | | 9/2008 | Cleland et al. |

FOREIGN PATENT DOCUMENTS

| | | |
|---|---|---|
| DE | 102005053530 A1 | 5/2006 |
| DE | 102008035635 A1 | 2/2010 |
| DE | 102008044232 A1 | 6/2010 |
| DE | 102013206398 A1 | 10/2013 |
| EP | 0057816 A2 | 1/1982 |
| EP | 0508143 A2 | 3/1992 |
| EP | 0927877 B1 | 11/1998 |
| EP | 2400275 A1 | 6/2011 |
| EP | 3312571 A1 | 10/2016 |
| FR | 1130808 A | 9/1955 |

OTHER PUBLICATIONS

International search report for related application PCT/EP2019/061627, dated Sep. 26, 2019.

* cited by examiner

PRIOR ART

Fig. 3

PRIOR ART

IMPEDANCE POINT LEVEL SENSOR

CROSS REFERENCE TO RELATED APPLICATIONS

This patent application claims priority International Patent Application PCT/EP2019/061627, filed on May 7, 2019, and thereby to German Patent Application 102018111058.8, filed on May 8, 2018.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is an impedance point level sensor.

Background of the Invention

Impedance point level sensors are known in principle from the prior art, for example for measuring point levels or fill levels. Typical applications for sensing a predefined fill level are process containers, such as process tanks, storage tanks, silos or pipelines in the process industry. Impedance point level sensors are often used as limit switches, i.e. to determine whether a fill medium is above or below a certain fill level, the point level, in different liquids and in bulk materials in granule and powder form.

Other types of limit switches and point level sensors are also known, which are selected depending on the field of use, process conditions and properties of the fill medium. In addition to impedance point level sensors, sensors operating according to the TDR (Time Domain Reflectometry) principle or vibration point level sensors or capacitively operating sensors are used. A switching command of the limit switch can for example start or stop filling devices or emptying devices in order to prevent the process container in question overflowing or running empty.

For the sake of simplicity, the terms impedance sensor, limit switch and point level detector are used equivalently instead of the term impedance point level sensor in the present application.

Figure 1:
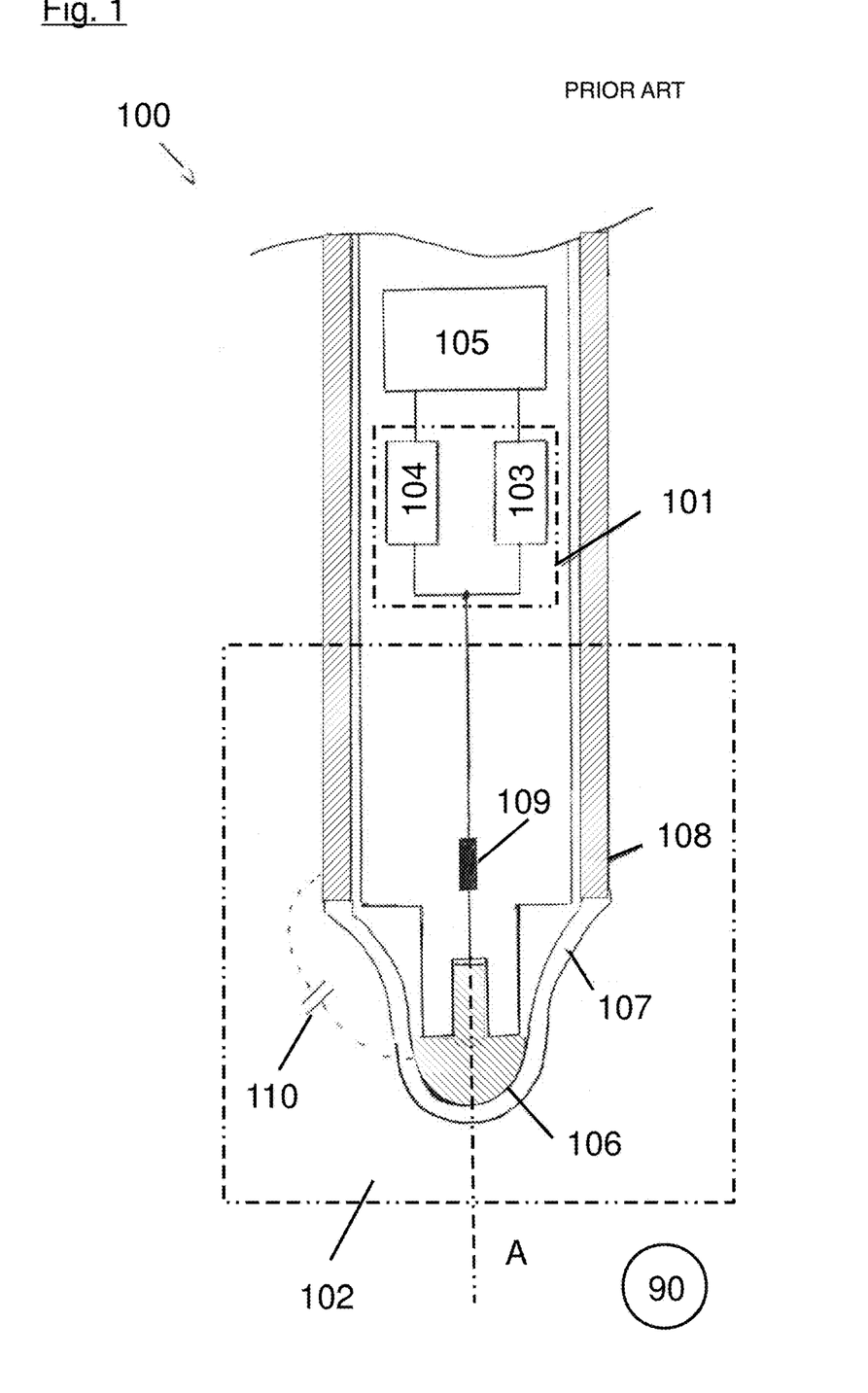
FIG. 1 is a simplified sectional diagram of an impedance sensor according to the prior art (already discussed).

A known impedance sensor 100 is shown in FIG. 1.

FIG. 1 shows a simplified sectional diagram with circuit blocks of an impedance sensor 100 according to the prior art. The impedance sensor 100 according to the prior art consists substantially of an electronic unit 101 and a measuring probe 102. In the present exemplary embodiment, the measuring probe 102 is in the form of a series resonant circuit. Between a measurement electrode 106 and a reference electrode 108, a measuring capacitance 110 is formed, which is connected to the measuring resonant circuit in the form of a series resonant circuit with a discrete inductor 109.

The measurement electrode 106 is rotationally symmetrical relative to a longitudinal axis L of the impedance sensor 100 and is isolated from a process chamber 90 by means of insulation 107. The reference electrode 108 is likewise rotationally symmetrical relative to the longitudinal axis L in the present impedance sensor 100. In the present exemplary embodiment, the reference electrode 108 is in the form of a tube which forms part of a sensor housing at the same time. The measurement electrode 106 is situated in front of the tube, as seen in the direction of the longitudinal axis L, and surrounded by the insulation 107 situated on the tube. The insulation 107 at the same time forms a front termination of the housing.

The discrete inductor 109 is advantageously selected such that a resonant frequency fres of the resonant circuit of between 100 MHz and 200 MHz results for a wide variety of media and covering states (empty, full and dirty).

An absolute value of a complex-valued impedance |Z|, which changes over the frequency, of this measuring resonant circuit is advantageously analysed between 100 MHz and 200 MHz, i.e. the measuring resonant circuit is excited by means of a frequency generator 103 with a frequency sweep at frequencies between 100 MHz and 200 MHz, and a response signal (frequency response) of the measuring resonant circuit is detected using a frequency detector 104. If there is a medium in the region of the measuring probe 102, the impedance behaviour of the measuring resonant circuit changes, i.e. in particular there is a shift of the resonant frequency fres thereof, at which a minimum of the impedance forms.

A frequency sweep means sequential excitation with a plurality of successive frequencies within a frequency range, the frequency range ideally containing all the possible resonant frequencies of the measuring resonant circuit.

The change in the impedance of the measuring resonant circuit is used for evaluation in an evaluation and control unit 105. Specifically, the frequency response is evaluated for a frequency change Δf and a change in the amplitude of a minimum of the impedance Z, also referred to as amplitude change, and a switching command is generated therefrom. Alternatively, the evaluation could also be carried out at a maximum of the impedance Z.

Figure 2:
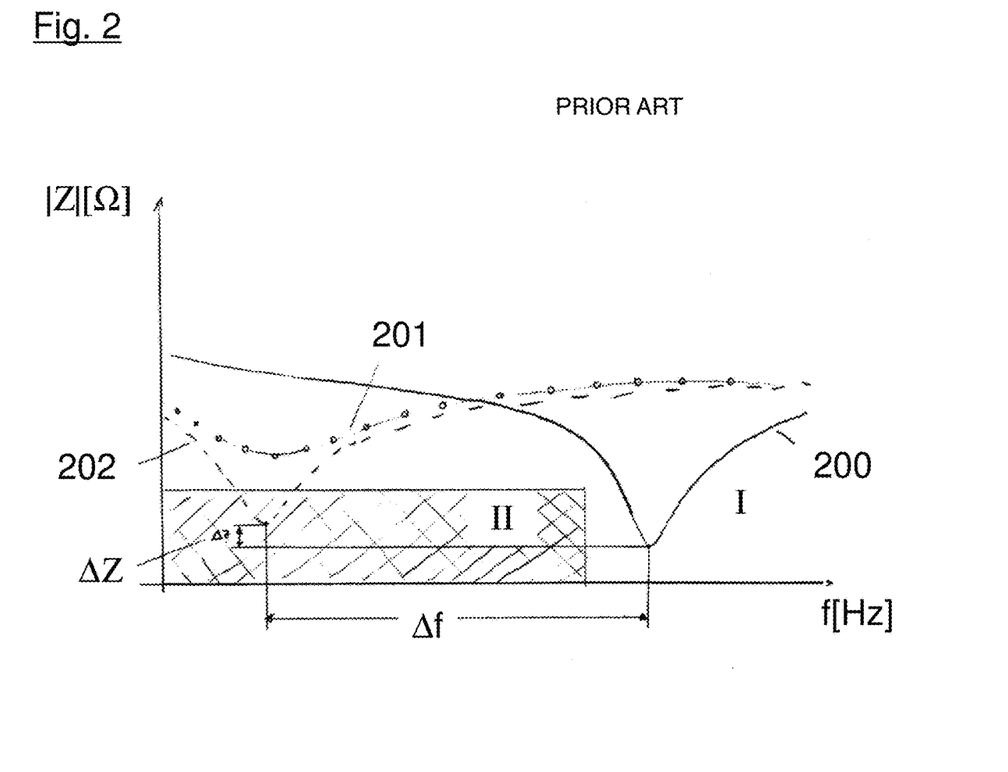
FIG. 2 shows the desired impedance behavior of the impedance sensor according to FIG. 1 (already discussed).

FIG. 2 presents the frequency responses of the impedance sensor 100 according to the prior art using the example of the medium ketchup.

A first curve 200 shows the resonant behaviour of a clean measuring probe 102. The absolute value of the impedance Z is shown over the frequency f.

The behaviour of a measuring probe 102 with ketchup adhering to it is shown in a second curve 201, and that of a measuring probe 102 completely covered in ketchup is shown in a curve 202.

Switching commands (empty, full) are realised by the evaluation and control unit 105, and only the minima of the resonance curves are used for the evaluation according to the prior art. These are evaluated for a frequency change Δf and amplitude change ΔZ. If the minimum of the resonance curve is in a first range I, the evaluation and control unit 105 outputs the switching command "empty". However, if the minimum is in a second range II, the switching command "full" is output. The two defined switching ranges I, II can be permanently programmed into the impedance sensor 100 at the factory or set and modified by a customer calibration. Ideally, the ranges should be defined such that the standard settings are sufficient for as many different media as possible, since a calibration by the customer is time-consuming and therefore undesirable.

Figure 3:
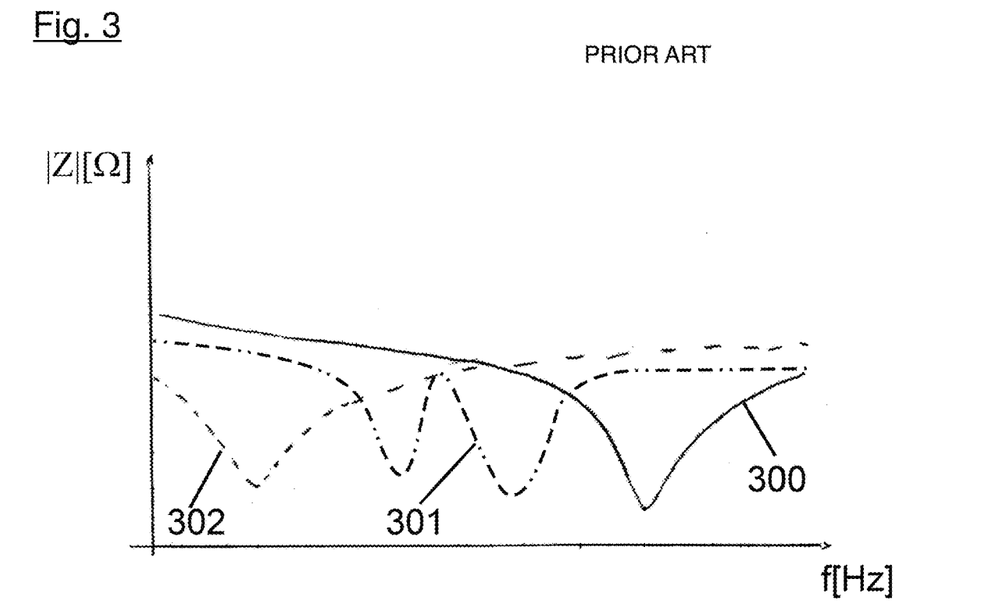
FIG. 3 shows the impedance behavior of the impedance sensor according to FIG. 1 in a plastic tank (already discussed).

With the impedance sensors 100 known from the prior art, the effect shown in FIG. 3 is observed, that is, that the position and the value of the resonance point depends greatly on the use situation. This effect is particularly pronounced for non-metallic measurement containers; in this situation, the resonance point does not form cleanly in the transition from the measuring tip (first contact with the medium, curve 300) to the housing (contact between the medium and the reference electrode, curve 302). Multiple minima and maxima (curve 301), which can cause switching errors, can be observed in this region, which is critical for the measurement.

This behaviour can be observed in particular in non-metallic measurement containers and when the impedance sensor is installed in the measurement container from above.

The problem addressed by the present invention is that of specifying an impedance point level sensor which delivers reliable measured values in all installation positions and in all measurement containers.

The objective is achieved with an impedance point level sensor as described herein.

BRIEF SUMMARY OF THE INVENTION

In a preferred embodiment, an impedance point level sensor (100) comprising
a measuring probe (102), which can be influenced by a medium surrounding the measuring probe (102) in a measuring capacitance (110), the measuring probe (102) comprising a measurement electrode (106) and a reference electrode (108) insulated from the measurement electrode (106), between which electrodes the measuring capacitance (110) is formed,
a measuring resonant circuit, in which the measuring probe (102) is arranged as a capacitance-determining element,
an electronic unit (101) having a signal generator (103) for exciting the measuring resonant circuit and a signal detector (104) for determining a response signal of the measuring resonant circuit,
a signal-processing unit (105), which is connected to the electronic unit (101), for generating a measurement signal, and characterised in that the measurement electrode (106) and the reference electrode (108) are designed and arranged in such a way that an increasing fill level of the medium reaches the reference electrode (108) earlier than the measurement electrode (106) or simultaneously.

In another preferred embodiment, the impedance point level sensor (100) as described herein, characterised in that the reference electrode (108) has an extension (112) in the direction of the measurement electrode.

In another preferred embodiment, the impedance point level sensor (100) as described herein, characterised in that the extension (112) is in the form of a pin, at least in some sections, wherein the extension (112) protrudes beyond the front of the measurement electrode (106) as seen in the axial direction (A).

In another preferred embodiment, the impedance point level sensor (100) as described herein, characterised in that the extension (112) is angled, wherein a first section (114) is arranged on or fastened to the reference electrode (108), and a second section (116) extends in the axial direction (A).

In another preferred embodiment, the impedance point level sensor (100) as described herein, characterised in that the extension (112) is in the form of a tube (118) which fits over the measurement electrode in the axial direction (A).

In another preferred embodiment, the impedance point level sensor (100) as described herein, characterised in that the tube is detachably connected to the reference electrode (108).

In another preferred embodiment, the impedance point level sensor (100) as described herein characterised in that the tube (118) has one or a plurality of openings (120), at least at an end on the reference electrode side.

In another preferred embodiment, the impedance point level sensor (100) as described herein, characterised in that the extension (112) is in the form of a metallisation (130) which extends in the axial direction (A).

In another preferred embodiment, the impedance point level sensor (100) as described herein, characterised in that the metallisation (130) is strip-shaped.

In another preferred embodiment, the impedance point level sensor (100) as described herein, in that the metallisation (130) is situated in a depression such that a surface free of discontinuities with a material surrounding the metallisation (130) results.

DETAILED DESCRIPTION OF THE INVENTION

An impedance point level sensor according to the invention, comprising a measuring probe, which can be influenced by a medium surrounding the measuring probe in a measuring capacitance, the measuring probe comprising a measurement electrode and a reference electrode insulated from the measurement electrode, between which the measuring capacitance is formed, has: a measuring resonant circuit, in which the measuring probe is arranged as a capacitance-determining element; an electronic unit having a signal generator for exciting the measuring resonant circuit and a signal detector for determining a response signal of the measuring resonant circuit; and a signal processing unit, which is connected to the electronic unit, for generating a measurement signal; and is characterised in that the measurement electrode and the reference electrode are designed and arranged in such a way that an increasing fill level of the medium reaches the reference electrode earlier than the measurement electrode or simultaneously.

The above design of the measurement electrode and the reference electrode means in particular that an increasing fill level reaches the reference electrode earlier than the measurement electrode or at least simultaneously with same in any installation position.

In this context, reach means that the fill level reaches a height at which the electrode in question is situated. In particular, it does not mean that the electrode in question must come into contact with the fill medium.

Because the fill medium is in contact with the reference electrode at the same time as or before a fill level reaches the height of the measurement electrode, a defined influence on the measuring capacitance is achieved, so that the minima and maxima are formed in a defined manner and independently of the installation position and the surrounding measurement container.

In one embodiment, the reference electrode can have an extension in the direction of the measurement electrode. Such an extension has the advantage that the reference electrode and the measurement electrode can be designed such that, for example, when installed in the measurement container from above, they are situated at an identical height, or the reference electrode even protrudes further into the container than the measurement electrode, i.e. that the measurement electrode and the reference electrode are reached by an increasing fill level simultaneously, or the reference electrode is reached before the measurement electrode.

The extension can be in the form of a pin, at least in some sections, in which case the extension protrudes beyond the front of the measurement electrode in the axial direction. A pin-like extension has the advantage that it is simple to produce and also does not cause any recesses or edges, which could be viewed negatively for example if the sensor is used in the food industry.

In the present application, "in the axial direction" indicates the direction of a longitudinal axis of the impedance sensor. The axial direction coincides in particular with an axis of symmetry of the measurement electrode which is rotationally symmetrical. In this manner, the measurement electrode can be in the form of a turned part, for example, which allows simple and cost-effective manufacture.

The pin-like extension can be, for example, screw-fastened or welded to or formed integrally with the reference electrode.

In one variant, the extension is angled, in which case a first section is arranged on or fastened to the reference electrode, and a second section extends in the axial direction. In this manner, the extension can be attached to the reference electrode in the radial direction and is therefore connected to the reference electrode only at one point and not linearly. To this end, the extension can be in the form of a bent wire part, for example angled by 90°.

Alternatively, the extension can be in the form of a tube fitting over the measurement electrode in the axial direction. Such a tube has the advantage that it is connected to the reference electrode circumferentially and surrounds the measurement electrode likewise circumferentially, so that the rotationally symmetrical structure is retained.

The tube can be connected to the reference electrode in a mechanically detachable and electrically conductive manner, for example via a screw connection, a plug connection or the like. It is therefore possible to attach the extension only when the installation situation and/or the measurement container and/or other conditions require it to achieve reliable measurement results.

To ensure good inflow and outflow of the fill medium, the tube can have a plurality of openings, at least at an end on the reference electrode side. This prevents an air pocket forming in the tube and preventing further flow of the medium from below in the case of vertical installation from above, or medium collecting in the tube and no longer flowing out in the case of vertical installation from below.

In a particularly unobtrusive and compact variant, the extension is in the form of a metallisation extending in the axial direction. Typically, the measurement electrode is surrounded by an insulator and thereby insulated from the reference electrode and the process chamber. A metallisation can be applied to this insulator and connected to the reference electrode on the rear. An extension of the reference electrode can be realised without any additional attachment parts in this manner.

The metallisation must not be formed over the entire area but should only cover a part of the insulation. Otherwise, it would inhibit the formation of the measuring capacitance.

The metallisation can be strip-shaped, for example. In this manner, a metallisation can be achieved with one or two strips which are attached to the reference electrode, extend beyond a plane of the measurement electrode and back to the reference electrode.

The metallisation can be applied so thinly or situated in a depression such that a surface free of discontinuities with a material surrounding the metallisation results. In the present case, a surface free of discontinuities means a surface without gaps and edges, so that use in food industry applications is still possible.

DETAILED DESCRIPTION OF THE FIGURES

Figure 4:
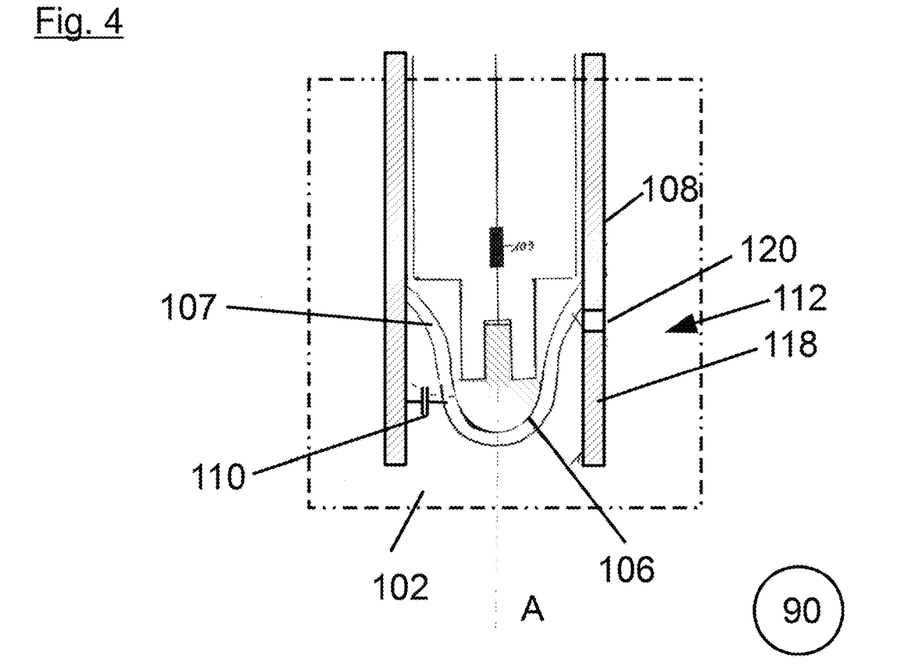
FIG. 4 is a line drawing evidencing a first exemplary embodiment of an impedance sensor according to the present application.
Figure 5:
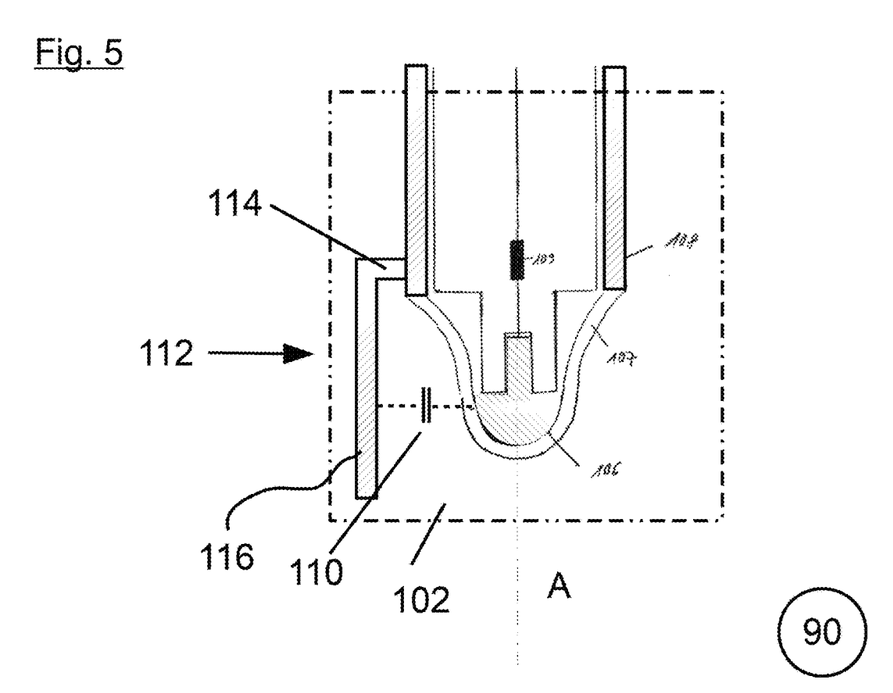
FIG. 5 is a line drawing evidencing a second exemplary embodiment of an impedance sensor according to the present application.
Figure 6:
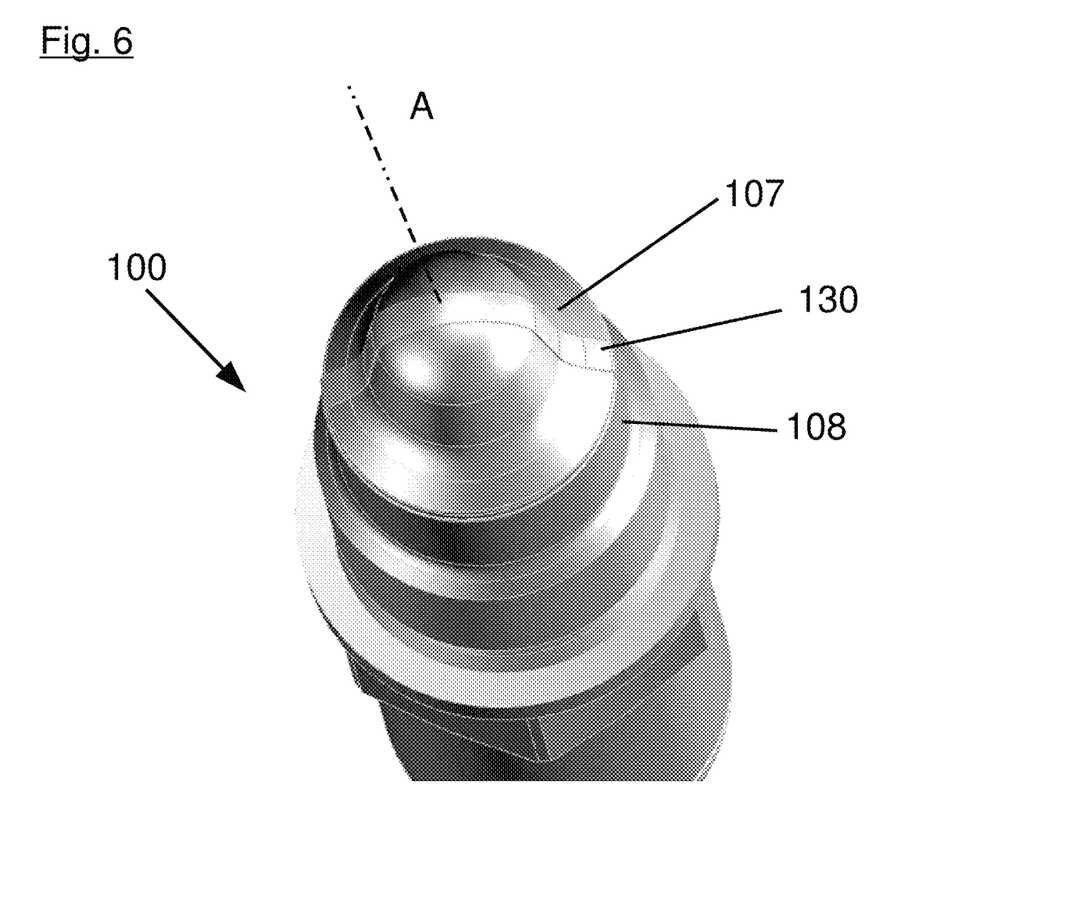
FIG. 6 is a line drawing evidencing a third exemplary embodiment of an impedance sensor according to the present application.

To simplify the diagram, an electronic unit 101 and a signal-processing unit 105 are not shown in FIGS. 4 to 6. However, these are included in all the exemplary embodiments, like in the prior art.

FIG. 4 shows a first exemplary embodiment of an impedance point level sensor 100 according to the present application. In the exemplary embodiment shown, the impedance point level sensor 100 is shown in a simplified sectional diagram as used for the prior art.

The impedance sensor 100 according to FIG. 4 has a measuring probe 102, which in the present exemplary embodiment is formed from a measurement electrode 106, which is oriented in the axial direction A and is rotationally symmetrical, and a reference electrode 108, which is likewise oriented in the axial direction A and is rotationally symmetrical, between which electrodes a measuring capacitance 110 and a discrete inductor 109 are formed. In the present exemplary embodiment, the reference electrode 108 is in the form of a tubular housing of the impedance point level sensor 100, said housing having a tubular extension 112. In the exemplary embodiment of FIG. 4, the extension 112 is in the form of a tube 118 which is formed integrally with the reference electrode 108. The measurement electrode 106 is isolated and electrically insulated from the reference electrode 108 and from a process chamber 90 by insulation 107.

At an end of the extension 112 facing the reference electrode 108, the tube 118 has at least one opening 120 or a plurality of openings 120 which run in the radial direction and, when the impedance point level sensor 100 is installed in a container vertically from above, prevent air being enclosed in the cavity formed between the extension 112 and the insulation 107, which air would prevent the process medium passing into said cavity. When the impedance point level sensor 100 is installed in a container vertically from below, medium collected in the cavity can flow out through the openings 120, and therefore measurement errors are also avoided here.

In the exemplary embodiment shown in FIG. 4, a measuring capacitance 110, which is arranged in a series resonant circuit consisting of the inductor 109 and the measuring capacitance 110, is formed substantially between the tube 118, which is electrically conductively connected to the reference electrode 108, and the measurement electrode 106. A medium passing into the interstice between the reference electrode 108 and the measurement electrode 106 acts as a dielectric and changes a value of the measuring capacitance 110.

It is critical for the positive effects in the measurement with the impedance point level sensor 100 presented here that the extension 112 or the tube 118 is designed and arranged such that a fill level of a medium to be measured in the process chamber 90 reaches the reference electrode 108 or the extension 118 before the measurement electrode 106 in any installation position.

FIG. 5 shows an alternative embodiment of an impedance point level sensor 100 with an extension 112. The impedance point level sensor 100 according to FIG. 5 differs from the impedance point level sensor 100 of FIG. 4 only in the design of the extension 112, and therefore the rest of the installation is not discussed in more detail at this point.

In the exemplary embodiment of FIG. 4, the extension 112 is in the form of a pin-like extension 112 of the reference electrode 108. A first section 114 of the extension 112 is attached to the reference electrode 108 in the radial direction and is welded thereto, for example. A second section 116 of the extension 112 is formed integrally with the first section 114 and extends in the axial direction A. The second section 116 is so long that the extension 112 protrudes beyond the front of the measurement electrode 106 in the axial direction, so that it is ensured, in the installation position shown here, that an increasing fill level comes into contact with the extension 112 of the reference electrode 108 first, and the fill level reaches the measurement electrode 106 at a later point in time.

In this exemplary embodiment too, a major part of the measuring capacitance 110 is formed between the extension 112, in the present case mainly the second section 116 of the extension 112, and the measurement electrode 106. A second portion of the measuring capacitance 110 will also form, however, between the measurement electrode 106 and the reference electrode 108.

An advantage of the structure shown in FIG. 5 lies in the smaller number of recesses and edges, and therefore it is possible to use this structure in the food industry.

FIG. 6 shows a third exemplary embodiment of an impedance point level sensor 100 according to the present application. The impedance point level sensor 100 is shown in a perspective view; the impedance point level sensor 100 is shown obliquely from the front in the present diagram. The rotationally symmetrical structure of the impedance point level sensor 100 can be seen particularly clearly.

In the exemplary embodiment shown in FIG. 6, the extension 112 of the reference electrode 108 is in the form of a strip of L-shaped metallisation 130 applied to the insulation 107. In the exemplary embodiment shown, the metallisation 130 is in the form of a narrow strip with a width of approximately 0.5 to 10 mm. The embodiment shown therefore functions without additional attachment parts, and therefore a particularly compact and also very cost-effective implementation, thanks to the metallisation, of an extension 112 of the reference electrode 108 can be implemented. In the present exemplary embodiment, the metallisation 130 has a thickness of 5-1000 μm.

The embodiment shown in FIG. 6 also ensures that an increasing fill level always reaches the reference electrode 108 or the extension 112 connected electrically thereto first, independently of the installation position of the impedance point level sensor 101.

The metallisation 130 can for example also be arranged in a groove in the insulation 107 so that no step is formed between the insulation 107 and the metallisation 130.

LIST OF REFERENCE NUMBERS

100 Impedance point level sensor
101 Electronic unit
102 Measuring probe
103 Signal generator
104 Signal detector
105 Signal-processing unit
106 Measurement electrode
107 Insulator
108 Reference electrode
109 Inductor
110 Measuring capacitance
112 Extension
114 First section
116 Second section
118 Tube
120 Opening
130 Metallisation
A Axial direction Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An impedance point level sensor comprising:
a measuring probe, a measuring capacitance of the measuring probe influenced a medium surrounding the measuring probe, the measuring probe comprising a measurement electrode and a reference electrode insulated from the measurement electrode, the measurement capacitance is formed between the electrodes,
the measuring probe is arranged as a capacitance-determining element in a measuring resonant circuit,
an electronic unit having a signal generator for exciting the measuring resonant circuit and a signal detector for determining a response signal of the measuring resonant circuit,
a signal-processing unit, which is connected to the electronic unit, for generating a measurement signal, and
wherein the measurement electrode and the reference electrode are designed and arranged in such a way that an increasing fill level of the medium reaches the reference electrode earlier than the measurement electrode or simultaneously and the reference electrode has an extension in the direction of the measurement electrode.

2. The impedance point level sensor of claim 1, wherein the extension is in form of a pin, at least in some sections, wherein the extension protrudes beyond the front of the measurement electrode as seen in the axial direction.

3. The impedance point level sensor of claim 2, wherein the extension is angled, wherein a first section is arranged on or fastened to the reference electrode, and a second section extends in the axial direction.

4. The impedance point level sensor of claim 1, wherein the extension is in form of a tube which fits over the measurement electrode in the axial direction.

5. The impedance point level sensor of claim 4, wherein the tube is detachably connected to the reference electrode.

6. The impedance point level sensor of claim 4, wherein the tube has one or more openings, at least at an end on the reference electrode side.

7. The impedance point level sensor of claim 1, wherein the extension is in form of a metallization which extends in an axial direction.

8. The impedance point level sensor of claim 7, wherein the metallization is situated in a depression resulting in a surface free of discontinuities surrounding the metallization.

9. The impedance point level sensor of claim 1, wherein the metallization is strip-shaped.

* * * * *